Aug. 1, 1967  E. F. PETERSON  3,333,799
FITTER FOR VIBRATING DEVICES
Filed Aug. 18, 1965

INVENTOR
EDWIN F. PETERSON
By  D. J. Holmes
AGENT

United States Patent Office 3,333,799
Patented Aug. 1, 1967

3,333,799
FITTER FOR VIBRATING DEVICES
Edwin F. Peterson, c/o Vibrator Manufacturing Co.,
Neponset, Ill. 61345
Filed Aug. 18, 1965, Ser. No. 480,734
3 Claims. (Cl. 248—14)

ABSTRACT OF THE DISCLOSURE

This apparatus comprises a combination of a structural shape, such as an "angle iron" or "channel iron" or similar shapes, a vibrator of commercially available kinds and a fitter for mounting the vibrator on the structural shape in a position to cause the orbital vibration of same to be exerted in the plane of a web of the structural shape. By such combination, high vibrating forces can be imparted to the structural shape without causing damage to the shape or to equipment with which same is attached.

---

Vibrators of the general kind adapted for use in combination with the fitter of the present invention are shown in my prior Patents Nos. 2,999,393, 3,036,658, 3,076,346 and 3,177,731; and are related to vibrator mount Patents Nos. 3,107,899 and 3,112,016.

The principal object of the invention is to provide an improved fitter for vibrating devices of the above kinds (which are adapted for mounting on a flange of an angle structural shape "angle iron" for imparting orbital vibrations in the plane of the flange mounting same) for fitting said vibrating devices upon structural steel shapes, such as "channel iron" or "Z-bars" or other known shapes, as well as fabricated angle plates, etc., for imparting vibrations in the plane of a web of the shape that is at a right angle to a flange for mounting the fitter.

A more specific object of the invention is to provide a rugged fitter of the kind set forth in the preceding object comprising a minimum number of parts, being readily portable, being quickly attachable and detachable to flanges on structural beams and shapes, and being fabricated from a steel or iron casting of the type of iron having favorable shock resistance to fracture while retaining desirable machining qualities.

Another object of the invention is to provide pairs of identical fitters to provide for mounting different vibrators on structural steel shapes for the purposes expressed hereinabove, which vibrators have differently spaced apart mounting legs, whereby to minimize the number and weight of fitters required by a user of such different vibrators.

Other objects and advantages of the invention reside in details of construction of the fitter, and will be obvious to those skilled in the art upon consideration of the following specification and claims read in view of the accompanying drawings wherein:

Figure 2:
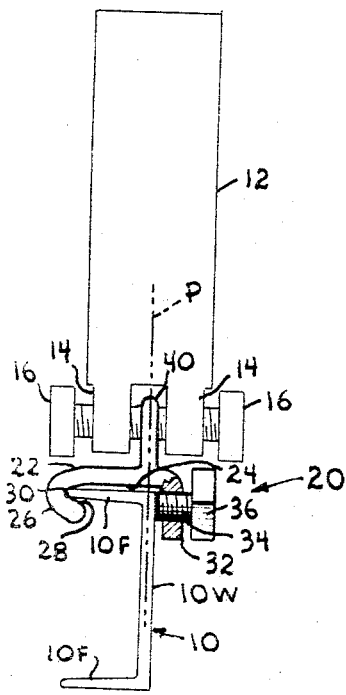
FIG. 2 is an end view looking toward the right at FIG. 1.

Referring now for details of construction to the drawing, by way of example, a channel shape 10 of standard dimensions, which shape may comprise a side sill on a freight car, or the like, is shown. It is particularly advantageous in this invention to apply a vibrator of the kind shown in Patent No. 2,999,393, which is shown in outline at 12 to the channel member 10 forming a side sill on a railroad car and particularly those cars having bottom openings through which fluent materials may be dumped by gravity out of the openings with same over an unloading pit for such cars, sometimes called hopper cars.

The vibrator 12 has a pair of depending legs 14 attached to side plates thereof and extending downwardly and receiving set screws 16 which are normally adapted to engage a flange of an angle structural shape, or the like, inasmuch as many structural devices, including hopper cars, have angle irons forming the side sills thereof. The vibrator 12 is one adapted to conveniently connect to such flanges on angle irons and the like of railroad cars as well as other structures including flanged members whereby to impart vibrations in the plane of the flange to which it attaches through the structural member to a bin or the like to transmit vibrations to the materials in the bin to cause the same to be moved by gravity as in unloading a dump car as set forth briefly in the example above.

Certain structural apparatus, including some railroad cars, have structural channel irons 10 (rather than angle irons) forming side sills, or othe structural members connected to the hoppers or bodies of the cars. It is desirable to impart vibrations to the web of the channel 10 inasmuch as the greatest strength of the channel member is in a plane lying in the web 10W of the channel iron 10. However, the vibrator 12 is not equipped to mount directly on a channel shape 10 in the plane of the web 10W although same can readily be mounted on a flange 10F thereof for imparting vibrations in a lateral direction as viewed in the drawing. However, it is to be noted that the strength of the channel shape 10 in the plane of a flange 10F is considerably less than in the plane of the web 10W, and for high energy vibrations the channel member 10 may be subject to damage in the presence of high energy vibrations if a vibrator 12 is mounted on a flange 10F.

With vibrators of the kind 12, high energy levels are attained and usually needed to move materials. For example, a 25 pound-inch unbalance in a vibrator system if rotated at or near 2000 r.p.m. will generate 3000 pounds centrifugal force. This gives a resultant total force output in one minute of 6,000,000 pounds $$(2000 \times 3000 = 6,000,000)$$

A similar vibrator except that it would have a 1 pound-inch unbalance and be capable of 6000 r.p.m. would generate 1000 pounds force at this speed. Again, the result will be 6,000,000 pounds of force per minute $$(6000 \times 1000 = 6,000,000)$$

delivered to the structural member by the mounted vibrator.

For the foregoing reason, when high energy vibration is desirable to facilitate most ready movement of materials that are relatively difficult to move except in the presence of high energy vibrations, it is desirable to provide both in railroad car equipment and other structural apparatus a channel shape 10 for transmitting vibrations thereto inasmuch as the channel shape has greater strength and greater ability to transfer high energy levels to apparatus to be vibrated. On the other hand, it is not practicable to provide each vibrator 12 with a fixed part thereon for rendering same readily attachable to flanges 10F of channel shapes 10. In addition to this, different vibrators 12 have different dimensions and different spacings between legs 14 as viewed in FIG. 1.

For the foregoing reasons, it is preferable to provide two fitters 20 in pairs, which fitters are identical to each other. The fitters are designed so as to be conveniently and quickly fitted over a flange 10F for securement to a channel member 10. The details of construction of a fitter 20 will now be described.

Figure 1:
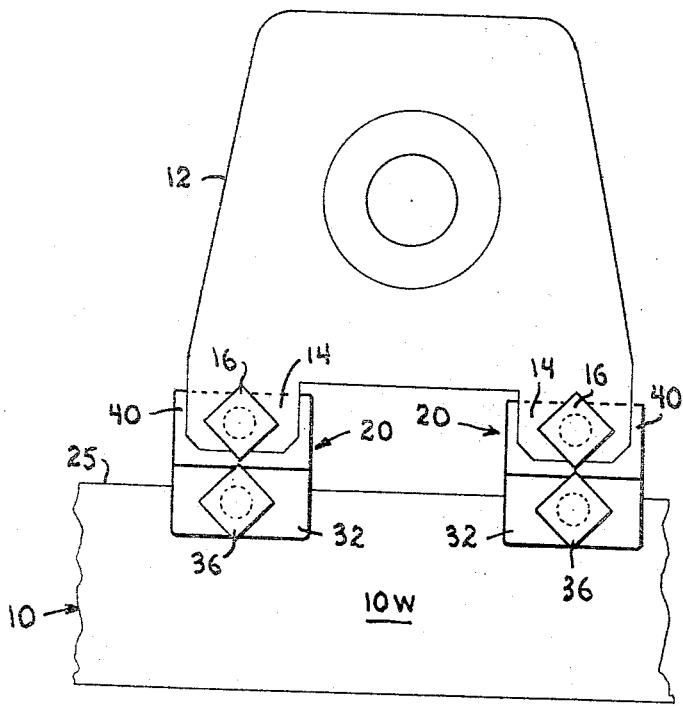
FIG. 1 is an elevational view showing a pair of fitters in heavy lines, and a channel shape and vibrator in lighter lines.
Figure 3:
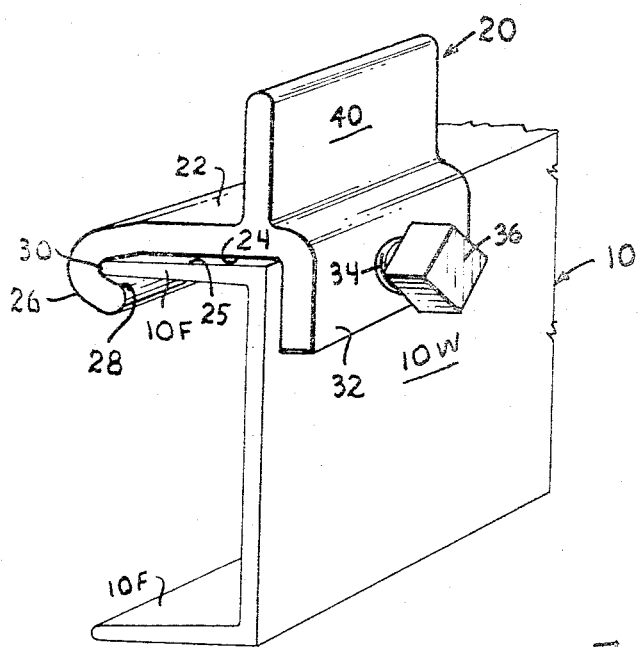
FIG. 3 is a perspective view of a fitter secured to a channel shape.

Each fitter 20 has a generally flat body portion 22 shown horizontal in FIGURES 1, 2 and 3 of the drawing. The body 22 is cast, preferably of ductile cast iron, and is used as cast except for drilling and tapping to receive a set screw to be described below. The body portion 22 has a generally flat bottom 24 which is sufficiently wider than the top surface 25 of a flange 10F to fit over same in the manner illustrated in FIG. 4 of the drawing.

Figure 4:
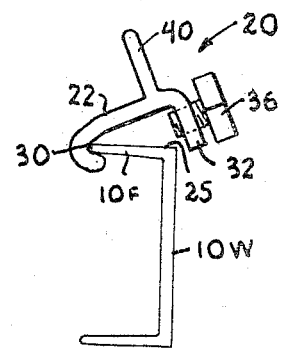
FIG. 4 is a view showing the manner of placing the fitter over a flange.

In the position shown in the drawing the left-hand side of the body 22 is formed in a return bend 26 which has a generally V shape internally at the surface 28 permitting the flange to tilt as in the position shown in FIG. 4 for readily fitting over the distal edge 30 of the flange 10F. This construction affords convenient hooking of the return bend end over the distal end 30 of the flange 10F and permitting rotation of same in a clockwise direction as viewed in FIG. 4 to move the bottom surface 24 of the body 22 into engagement with a top surface 25 of the flange 10F.

The opposite side of the body 22 (right-hand side as shown) has a depending clamping leg 32 which is transversely drilled and tapped at 34 to receive a set screw 36 shown as having a rectangular head whereby substantial force can be applied by a wrench. It is preferred that the set screw 36 have a cup-shaped end as well known in this art so as to gain good purchase in the metal on the surface of the web 10W to resist relative movement of the fitter 20 with respect to the channel member 10 under the influence of high energy vibrations.

The body 20 has an upstanding leg 40 which is positioned with respect to the body on the opposite side of the depending return bend leg 26 and the depending clamping leg 32 so as to cause the upstanding leg to lie generally in a plane P which passes into the web 10W of the channel shape 10. By such construction and arrangement, with the vibrator 12 being adapted to generate forces along the line in the plane P, the energy transmitted to the web 10W can be of maximum value within the limits of strength of the channel member 10 and thereby maximum efficiency can be attained by use of this fitter structure in connection with a channel shape 10, or the like.

An attribute of this invention is that the fitter 20 can be used singly for mounting low energy vibrators to channel members and the like, and a pair of the fitters 40 can be used as shown in FIG. 1 where high energy levels are desired to be transmitted to a channel member 10. The depending return bend end 26 having a V-shaped interior surface 28 provides ample solidity in conjunction with the set screw 36 for absorbing lower energy vibrations without working loose and chattering inasmuch as the distal end 30 of the flange 10F is engaged for a substantial portion of its length to give a line of contact at this surface, and the V-shaped surface holds the flat bottom 24 in intimate engagement with the top surface 25 of the flange 10F.

Use of the fitter

To illustrate one manner of use of this invention, not to be construed in a limiting sense, a series of freight cars to be dumped may have different structural shapes affording positions for attaching a vibrator 12. Some shapes may be angle irons, and some may be channel irons, or other conventional shapes. The vibrator 12 can be clamped directly by set screws 16 on a leg of an angle iron on one car and vibrate same for facilitating dumping of contents therefrom. After dumping, the set screws 16 are loosened and the vibrator 12 is removed.

On a succeeding car, having a channel iron 10, a pair of fitters 20 having a lateral size for fitting the return bend end 26 over the edge 30 of the flange 10F and being clamped by set screws 36 are placed on the flange 10F in spaced apart relationship as shown in FIG. 1. The vibrator 12 is then clamped on the legs 40 of fitters 20, and the freight car vibrated for unloading same.

Still other freight cars may have modified shapes. However, with a minimum number of light weight fitters 20 at hand, a maximum number of freight cars can be accommodated by a single vibrator 12. In each mounting of the vibrator 12, because of adapting structural shapes for transmission of vibrations through a major structural web, such as the web 10W, and not through a lesser strength member such as a flange 10F at a right angle to the web 10W, the highest energy vibrations can be transmitted and utilized.

While hopper car unloading has been explained by way of example, obviously bin unloading, chute transfer, compacting of material and many other uses can be made of the fitter hereinabove disclosed; of which, for purposes of illustration, one form of the invention has been described in detail. Obviously, in view of the present disclosure, modifications of the invention will occur to others working in the art. Accordingly, it is desired not to be limited in the invention only to the specific embodiment shown and described, but by the scope of the following claims.

I claim:

1. In vibrating apparatus, the combination of a structural shape or the like having at least one flange, a vibrator having attachment means arranged for mounting said vibrator, and a fitter for mounting said vibrator on a flange of said structural shape, said structural shape having a web at a right angle to the flange, said fitter, when mounted on said flange and supporting said vibrator, being adapted for transmitting the orbital vibrations created by said vibrator in the plane of the web of the structural shape, said fitter comprising a generally horizontal body part having a transverse width greater than the transverse width of the flange of said structural shape, a first depending leg on one side of said body part having a V-shaped return bend for fitting over the edge of the flange of said structural shape, a second depending leg on the other side of said body part spaced to be adjacent the outer surface of the web of said structural shape when said body part is moved to a position adjacent the surface of the flange of said structural shape, a locking device on said second depending leg for securing the fitter on said structural shape, and an upstanding leg on said body part on the side opposite thereof from said depending legs, said upstanding leg providing a mounting plane for the vibrator generally in the plane of the web of said structural shape.

2. A fitter as set forth in claim 1, said second depending leg having a transversely threaded hole therethrough, and said locking device being a set-screw cooperable with said threaded hole.

3. In vibrating apparatus, the combination of a structural shape or the like having at least one flange, a vibrator having attachment means arranged for mounting said vibrator, and a ductile cast iron fitter for mounting said vibrator on a flange of said structural shape, said structural shape having a web at a right angle to the flange, said fitter, when mounted on said flange and supporting said vibrator, being adapted for transmitting the orbital vibrations in the plane of the web of the structural shape, said fitter comprising a generally horizontal body part having a transverse width greater than the transverse width of the flange of said structural shape, a first depending leg on one side of said body part having a return bend forming a V-shaped surface for fitting over the edge of the flange of said structural shape, a second depending leg on the other side of said body part spaced to be adjacent the outer surface of the web of said structural shape when said V-shaped surface is in engagement with the flange of said channel shape, a locking device on said second depending leg for securing the fitter on said structural shape, and an upstanding leg on said body part on the side opposite thereof from said depending legs, said upstanding leg providing a mounting plane for the vibrator generally in the plane of the web of said structural shape.

References Cited
UNITED STATES PATENTS

| | | | |
|---|---|---|---|
| 739,259 | 9/1903 | Hock | 248—229 X |
| 1,288,945 | 12/1918 | Lovekin et al. | 248—228 X |

ROY D. FRAZIER, *Primary Examiner.*

F. DOMOTOR, *Assistant Examiner.*